United States Patent [19]

Bush

[11] 4,389,921

[45] Jun. 28, 1983

[54] EXPANSIBLE CHAMBER APPARATUS AND ITS OPERATION

[75] Inventor: Vannevar Bush, Belmont, Mass.

[73] Assignee: Massachusetts Institute of Technology, Cambridge, Mass.

[21] Appl. No.: 170,231

[22] Filed: Jul. 18, 1980

Related U.S. Application Data

[60] Division of Ser. No. 824,189, Aug. 12, 1977, Pat. No. 4,250,953, which is a continuation of Ser. No. 623,108, Oct. 16, 1975, abandoned, which is a continuation of Ser. No. 78,902, Oct. 7, 1970, abandoned.

[51] Int. Cl.³ .......................... F01B 29/04; F16J 11/02

[52] U.S. Cl. .......................................... 92/59; 92/170; 29/56.5; 29/156.4 WL

[58] Field of Search ........................... 92/170, 171, 59; 51/290; 29/156.4 WL, 56.5; 409/293, 299

[56] References Cited

U.S. PATENT DOCUMENTS

| | | | |
|---|---|---|---|
| 128,635 | 7/1872 | Kitchin | 92/170 |
| 1,472,036 | 10/1923 | Anderson et al. | 29/156.4 WL |
| 1,824,216 | 9/1931 | Kopp | 65/108 |
| 2,414,931 | 1/1947 | Colwell et al. | 29/156.4 WL |
| 2,577,818 | 12/1951 | Show | 51/290 |
| 3,719,983 | 3/1973 | Funk et al. | 409/299 |
| 3,880,055 | 4/1975 | Nakomura | 92/170 |

*Primary Examiner*—Paul E. Maslousky

*Attorney, Agent, or Firm*—James Creighton Wray

[57] ABSTRACT

Ceramic coatings prevent metal to metal contact between double acting pistons and cylinders. Cylinders and pistons operate in true cylindrical form. Ceramic coated cylinders are gradually brought to operating temperatures while temporary cutting pistons shape the coating to a true cylinder at operating temperature. Cylinders are formed true while cold and cylinders and heads are jacketed with high heat flow conductors so that the cylinders and cylinder heads have uniform operating temperature.

4 Claims, 3 Drawing Figures

EXPANSIBLE CHAMBER APPARATUS AND ITS OPERATION

This application is a division of application Ser. No. 824,189, filed Aug. 12, 1977, now U.S. Pat. No. 4,250,953, which is a continuation of Ser. No. 623,108, filed Oct. 16, 1975, now abandoned, which is a continuation of application Ser. No. 78,902, filed Oct. 7, 1970, now abandoned.

BACKGROUND OF THE INVENTION

This invention involves the operation of a piston in a cylinder under conditions such that liquid lubrication cannot be used successfully. Such conditions arrive, for example, in devices used for compressing oxygen, where it is highly hazardous to allow compressed oxygen and organic materials to come into contact. They also arise in hot gas engines.

A hot gas engine consists of a closed interconnected assembly of spaces or chambers, with one such space heated and another cooled, a mechanism for transferring gas alternately between hot and cold spaces thus producing variations in pressure, and a cylinder and piston for converting such pressure variations into useful work. Hot gas engines have been studied for many years and have taken various forms.

In the construction of hot gas engines it has been usual to avoid the problem of operating a piston in a hot cylinder by locating the piston or pistons in a cool location where it can be lubricated by the use of conventional organic lubricants. This is an unsatisfactory solution for two reasons. Thus placing the piston forces compromises or design which may adversely affect efficiency or output per unit of weight. Second it involves the probability that oil droplets or vapor arriving at heated spaces of the engine will there decompose to form coatings which will severely limit engine life. This is especially serious for very high temperatures, now practicable with modern materials, are necessary if high efficiency is to be attained. This invention is concerned therefore with omitting liquid lubrication entirely, and locating a piston in a cylinder which will become hot during engine operation, although not as hot as the location of maximum temperature.

This problem has been approached by using piston rings capable of operating successfully at the maximum temperatures to which they will be subjected. If these temperatures are moderate, rings of organic material, commonly called plastics, may be used. At higher temperatures it is possible to use rings made of inorganic materials. Such material, for example consisting of sintered powdered calcium fluoride with its pores filled with lead monoxide, is often referred to as solid lubricants.

There are two objections to that solution of the problem. First, the coefficient of friction of any material operating against a dry surface is higher than one operating against a surface which is liquid lubricated, and that involves higher losses. In this connection it should be noted that, for large output per pound of a hot gas engine, high gas pressures are indicated, and that results in rings, as ordinarily designed, being pressed against the cylinder walls with high pressures per unit of area. Second, at these high unit pressures, ring wear is increased, which tends to limit engine life before overhaul.

SUMMARY OF THE INVENTION

The present invention omits the use of rings entirely, and provides a seal for the piston by ensuring that the clearance between piston and cylinder, under operating conditions, is caused to be very small indeed.

It should be noted in this connection that, in modern design of hot gas engines, it is common to use helium as a working gas. This gas flows readily through a restricted passage under a given pressure difference, as compared to air, or other gases that are not monatomic, and that this imposes severe limits on tolerable operating clearances.

Four criteria must be met if a clearance seal is to be pracically successful:

(1) Side thrust of piston against the cylinder wall should be avoided or rendered very small. (2) Metal to metal contact between relatively moving surfaces, in an inert gas at elevated temperatures should be avoided. (3) The cylinder and piston should be of true cylindrical form, within close limits, under all operating conditions. (4) There should be means for causing the clearance to arrive at a practically acceptable value under operating conditions, and to remain at substantially this value.

The first criterion is readily met if the cylinders are made double-acting. It is unnecessary to describe that detail, for it has long been used in steam engines. It involves a crosshead and guides. It results in no piston side thrust whatever except that due to lack of proper alignment, that due to inertial effects when the engine is used in a moving vehicle, and that due to the influence of flowing gas upon the piston. These can be made of negligible value compared to the side thrust in a single-acting cylinder, such as is commonly used in automobile engines of the internal combustion types.

The second criterion is met by placing a permanent coating of proper material on the surface of either piston or cylinder, preferably the latter. Such coatings, and the methods of applying them have been widely described. A desirable coating for use on stainless steel is composed of calcium fluoride bonded by a mixture of CoO, $B_2O_3$ and BaO. The mixture is adjusted to have approximately the same coefficient of expansion as the base metal. Such coatings are described in publications of the National Aeronautics and Space Administration. They wear very slowly indeed when normal pressures are low.

The third criterion is met in one of two ways. First, the cylinder is finished to a true form when it is at operating temperature, and provision made so that it will then arrive at approximately this same operating temperature under all operating conditions. Second the cylinder and cylinder head are made of uniform expansion coefficient throughout; the cylinder is finished to true form when cold, and provision is made to ensure that the cylinder and head remain at substantially the same temperature throughout their structure under operating conditions. In either case the piston is designed so that its temperature throughout will be substantially uniform under operating conditions, so that, finished to true form when cold, it will remain true when operating.

A simple form of hot gas engine, consists of a compressor, heater, expander, and cooler, connected in a closed loop, filled with a working gas which moves by intermittent motion about the loop. It will be understood that, in an engine, there may be many such loops which share a common heater and cooler. The compressor and expander may be double-acting, and driven by cranks on a common shaft. The piston and cylinder of the expander operate at high temperatures and thus cause difficult sealing problems. Preferably, that cylinder is cooled by some controllable fluid, such as by a flow of air, and a thermostat holds its temperature at any desired value by controlling the speed of a blower or pump or the position of a valve or shutter.

Valves are associated with compressor and expander; those of the compressor may be simple check valves. The compressor draws gas from the cooler, compresses it, and delivers it to the heater. A valve on the expander opens at the beginning of the power stroke, and hot compressed gas flows from the heater to the expander. After completion of part of the power stroke, at the point of cutoff, the expander valve closes. During the remainder of the power stroke the gas is expanded to lower pressure and temperature. During the return stroke a valve on the expander is held open, and the gas is delivered to the cooler.

A ceramic coating, such as described above, wears slowly under light unit pressure, but relatively rapidly under high pressure. Preferably, a coating of a few thousandth of an inch is placed on the cylinder.

Two pistons are provided, ground true to nearly the same diameter. One, a permanent piston, is shaped as a simple cylinder. The other, a temporary piston, is cut to a form having radially projecting bands. When the difference in diameter between the projecting surface and the body of the piston is made very small, as is desirable and will be discussed later, grooves may be introduced in the piston body adjacent the bands to receive the material removed from the ceramic coat. The difference in diameter between that of the projecting bands, and that of their base, need be only a few thousandths of an inch. It is the bands which approximate the diameter of the plain piston. When cold the pistons fit loosely in the coated cylinder.

The cylinder and the pistons are made of alloys having different coefficients of expansion, that of the pistons being higher. For example, a stainless steel, of a composition Cr 18–20, Ni 8–10 C 0.08–0.20 percent has an expansion coefficient, per degree fahrenheit, of about $1.11\times10^{-5}$ when measured between 50° F. and 1800° F., whereas a steel with composition Cr 23–30, C 0.35 percent has only about a $0.7\times10^{-5}$ coefficient of expansion. Intermediate values are available by adjusting composition. A difference of coefficients of about 5 to 10% is suitable for use in the present invention.

The temporary piston is placed in the cylinder; the heater is brought to full temperature, and the gas is brought to full operating pressure. The thermostat is set for a low value of temperature. The engine is preferably connected to a dynamo, so that its speed can be closely controlled.

With the engine turning over at moderate speed, the cylinder temperature is allowed to rise slowly. The cylinder although finished to a true form when cold, will now become slightly distorted. This is due to the fact that its temperature will not be fully uniform along its length and also to the fact that the cylinder head will not come to the same temperature as the cylinder. As temperature rises, and contact is made between piston and cylinder, the coating is gradually worn down until it attains the form of a true cylinder. The temperature at which the process is terminated depends upon the temperature considered to be optimum for regular operation, and any difference noted between diameters and expansion coefficients of the two pistons. Ideally, the temperature at termination of the wearing in operation is equal to the chosen operating temperature.

If this process were carried on with an uncoated cylinder, in an inert gas, the engine would sieze as soon as contact was made. That is because welding over very small areas of contact would occur. With a ceramic coating, no welding can occur. There may be, however, a tendency for the power input to the dynamo to decrease abruptly, or even for the engine to stall. If so, the speed of operation, or the rate of rise of temperature, or both should be lowered.

To reduce the tendency toward seizure, or to allow the wearing in process to be carried out more rapidly, the projections on the temporary piston may be made of a different metal than the body of the piston. The reason that this improves performance is as follows: When contact first occurs there is a consequent heating of the material at the region of contact, and a rise of temperature. This occurs primarily in the projections, for the cylinder is of much greater bulk. This temperature rise causes a local expansion and hence tends to increase the extent of contact. The effect is not large, for the penetration of the heating effect into the projection is not great, and the ring of projection cannot expand independently of the bulk of the piston. Nevertheless, decreasing this effect will facilitate the wearing in process. Invar, a 38% nickle steel, has nearly a zero coefficient of expansion at room temperature. Alloys with a somewhat different percentage of nickle have their minimum coefficient at higher temperatures. The one chosen should have its minimum expansion coefficient at the temperature at which greatest contact is being made, which is at the end of the wearing in process.

The above process produces a true inner surface of the cylinder and thus satisfies the third criterion. The temporary piston is replaced by the permanent piston, and the engine is ready for operation.

To meet the fourth criterion, the thermostat is set at a value at which there is no positive contact between piston and cylinder, but at which the clearance is very small and the flow of working gas past the piston under operating conditions is tolerable. When starting the engine from a cold condition, the clearance initially is relatively large, and the efficiency hence is relatively poor. But heating occurs rapidly, and good operating conditions soon are attained.

To set the operating temperature it is best to continue operation with the dynamo connected. As the temperature is slowly raised, the first piston-cylinder contact is clearly shown by an instrument in the dynamo circuit. The thermostat is then set to hold a temperature somewhat below that point.

One further point needs to be considered. During operation there is a tendency for temperature along the cylinder not to be uniform. This is due to the fact that the temperature of the working gas in contact with the walls is not uniform along the cylinder. It is partly but not completely offset by thermal conduction in the cylinder walls.

Cylinder wall temperature gradients are also offset by another process. The temperature of the piston tends to be nearly equal to the average temperature of the cylinder wall. This is because there is a path of low resistance to heat flow between cylinder and piston across the very small gap between them, compared to the resistance to heat flow from gas to the piston heads across the boundary layer of substantially quiescent gas near these walls, and compared to the resistance to flow along the piston rods. This is of great advantage. If the temperatures of cylinder and piston are held nearly equal, and the cylinder temperature is held constant, the clearance will not alter substantially during alterations in performance such as change of load.

The strong tendency toward equality of temperature has another effect. If the temperature along the cylinder is non uniform, the piston-cylinder wall heat exchange tends to render temperature along the cylinder more nearly uniform. It does so by the piston receiving heat from the cylinder at position of maximum cylinder temperature, and delivering heat at position of minimum cylinder temperature.

There is another practical matter to be considered. It is readily possible to arrange a thermostat and a system of air flow to maintain the temperature of the cylinder constant within very close limits at the point on the cylinder where a thermocouple or its equivalent is attached. But this by no means ensures that the cylinder temperature will be the same at all points. This would do no harm, using the above process, provided the distribution of temperature over the cylinder could be assumed to be identical under all conditions. This, however, can hardly be expected to be strictly true.

For these reasons it is desirable to provide a means by which the cylinder temperature is caused to become close to uniformity over its entire surface under varying conditions. Such a means is present to some extent by conduction in the cylinder wall, and the piston action described above. But it is desirable, for best operation, to enhance this effect by additional means.

There has been described in technical literature recently a powerful means for transferring heat from one place to another, and also for causing uniformity of temperature over an area. In its simplest form it is commonly called a heat pipe.

It consists of a tube, the interior surface of which is bonded to a porous or fibrous material. The air is exhausted, and a liquid is introduced which will wet the coating and hence pass through it readily under the influence of capillarity. The liquid is chosen with regard to the temperature of operation, and should have a substantial vapor pressure at this temperature. If there is a difference of temperature between two parts of such a tube, liquid evaporates at the point of higher temperature and condenses at the lower. Vapor flows in one direction, and liquids flow by capillarity in the other direction. The result is that such a tube can conduct heat from one end to the other far better than a solid rod of copper of the same size.

For the purposes of the engine, a mesh of stainless steel, such as is used in steel wool, is indicated, and as a transfer material, metallic sodium or a sodium potassium alloy is used. A casing is placed about the cylinder. The porous material is applied both to the cylinder and to the interior wall of the casing. The entire inner wall of the enclosed space between cylinder and casing should be covered with the porous material, so that liquid can readily travel from casing to cylinder. When the casing is air cooled, there is a strong tendency for temperatures to become uniform throughout.

This same heat flow apparatus is applied to the cylinder head. It is made in two parts, bolted or welded together, interior walls covered with the porous material, exhausted of air, the sodium or other fluid introduced, and sealed. This will tend to produce uniformity of temperature of the head material, in spite of the effect of passage for entrance and exit of working gas into and out of the cylinder.

The method may be extended to ensure close equality of temperature between head and cylinder. For this purpose there need to be supplied passages for flow of liquid and of vapor between head and cylinder, as will be discussed below. When temperatures are thus forced toward close uniformity over both cylinder and head there will be very little distortion as the assembly becomes heated, provided cylinder and head have equal and uniform expansion coefficients. This will greatly decrease the amount of wearing in necessary. In fact, with care in construction, and the cylinder coating finished to true form when cold, the need for cylinder shaping or wearing in is eliminated.

An engine, constructed in this way has an almost unlimited life, as far as cylinders are concerned. There is no oil to disintegrate. The cylinder coating wears very slowly after clearance has been established.

One object of the invention is the provision of expansible chamber apparatus having a cylinder externally surrounded by a uniform temperature promoting enclosure with capillary material and fluid which changes from a fluid to a vapor at operating temperatures and having an internal refractory coating with a temporary piston with shaping bands reciprocated in the cylinder and a permanent piston replacing the temporary shaping piston.

The invention has as another object the provision of refractories-lined cylinders with shaping pistons and permanent pistons or providing lubricant-free piston sealing at operating temperatures.

This invention has as further objects the provision of refractory-lined cylinders and the provision of shaping pistons, and the provision of purely cylindrical pistons for sealing pistons and cylinders and lubricant-free operation at controlled operating temperatures.

Another object of the invention is the provision of uniform temperature controlling methods and apparatus employing cylinder enclosures, capillary materials and fluid which vaporizes and condenses hotter and less hot portions of the cylinder and enclosure, flowing gas through open spaces in enclosure and flowing liquid through the capillary material to attain high heat mobility along the cylinder.

These and other and further objects of the invention are apparent in the disclosure which includes the foregoing and ongoing specification, the claims and the drawings.

DETAILED DESCRIPTION OF THE DRAWINGS

Figure 1:
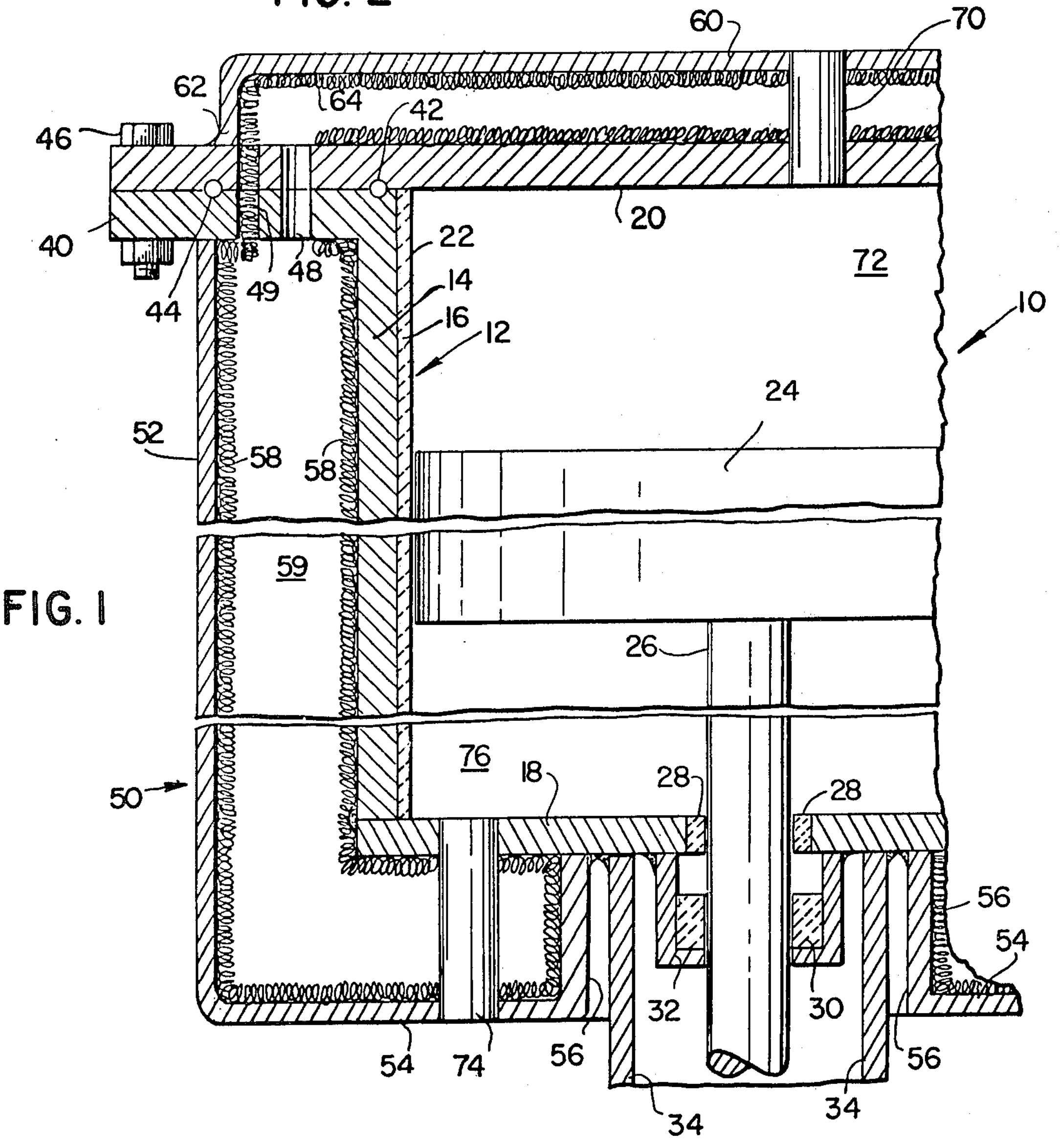
FIG. 1 shows a lined and heat-jacketed cylinder.

In FIG. 1, an expansible chamber device 10 is shown in a foreshortened cutaway detail. Cylinder 12 has a cylindrical wall 14 with a refractory lining 16. Base portion 18 of the cylinder and the cylinder head 20 are uncoated. Preferably, the cylinder 12 is uniformly constructed of a material having a known coefficient of expansion, such as a particular composition of stainless steel. The refractory lining 16 on cylinder wall 14 is a suitable material which has a high heat stability, low wear characteristics under small normal pressures and a coefficient of expansion which is identical to the coefficient of expansion of the material of cylinder wall 14. The interior surface 22 of cylinder coating 16 is exactly cylindrical at operating temperature of expansible chamber 10. Permanent cylindrical piston 24 has a close clearance with the interior surface 22 of coating 16. Piston rod 26 is rigidly attached to piston 24 and the piston rod is connected at its lower end to a crosshead in a crankbase to ensure that the piston rod and piston move in pure reciprocation. The piston rod opening in cylinder base 18 is coated with a refractory coating 28 which has a very close clearance with the piston rod. Refractory coating 28 may be worn in at operating temperatures in the same manner as the cylindrical shape of the inner surface 22 of cylinder coating 16. No further seal of the piston rod is necessary; however, an additional seal, such as a large refractory annular block 30 in a retainer 32, may be provided.

A relatively thin long tube 34 is welded at its upper end to cylinder base 18, and the lower end of tube 34 is welded to the crankbase, which is not shown in the drawing. To remove the piston from the cylinder, the lower end of piston rod 26 is disconnected from the crosshead, and the piston and rod are pushed upward out of the cylinder from which the head has been removed. A radially outward extending lip 40 at the upper extremity of cylinder wall 14 seals and secures head 20. O-rings 42 and 44 are compressed in annular grooves in lip 40 and head 20 by tightening bolt 46 to form a complete seal. A plurality of holes 48 and 49 extend through the cylinder head 20 and lip 40 to provide passages for encircling heat transfer fluid.

To promote uniform temperature over the entire surface of cylinder 12, a heat flow enhancing enclosure 50 is provided. Enclosure 50 has a cylindrical wall portion 52 which is spaced outward from cylinder wall 14. The upper edge of wall portion 52 is welded to the outward extending lip 40 of the cylinder. The enclosure has an integrally formed base 54 which terminates inwardly in a cylindrical wall 56 which is welded at an upper edge to base 18 of the cylinder. A capillary material, such as steel wool 58, lines the entire inner wall of the heat flow fluid cavity. A heat transfer fluid, for example sodium, is sealed within the cavity. In a liquid state, sodium flows along the steel wool by capillary action to portions of the cylinder which are relatively hot. There, vapors are formed taking heat from the hot cylinder portions, and the vapors flow to less hot portions where they condense and give off heat. The liquid phase then flows along the steel wool toward the hotter portions, completing the cycle.

In one embodiment of the invention, the enclosure is upwardly terminated at the outward extending lip 40 of the cylinder. In another embodiment, such as shown in FIG. 1, holes 48 and 49 are formed in head 20 and in lip 40, and the enclosure is continued by a cap portion 60 which is welded at its edge 62 to the cylinder head. Steel wool 64 lines the cylinder head and closure wall 60 to provide capillary flow of the heat conducting fluid in its liquid phase. As shown in the drawing, holes 49 are filled with steel wool to promote flow of the liquid while holes 48 are void of steel wool to promote flow of the gaseous phase of the transfer of fluid.

Tube 70 provides working fluid access to upper chamber 72, and tube 74 gives working fluid access to lower chamber 76 of the double-acting expansible chamber 10. In the present case, the working fluid is helium which is alternately expanded in the upper and lower chambers 72 and 76, driving piston 24 and rod 26.

Figure 2:
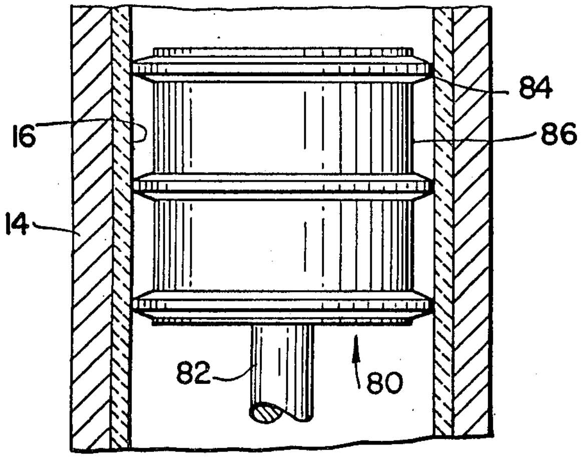
FIG. 2 represents a wearing in process in which a refractory internal coating on a cylinder is shaped by projections on a shaping piston.

FIG. 2 shows the wearing in of ceramic or refractory coating 16 on cylinder wall 14 by the use of a shaping piston 80. In the initial wearing in procedures, piston 80 and its rigidly attached rod 82 are inserted in the cylinder. The piston rod is connected at its lower end to the crosshead and the engine is gradually brought up to operating temperature and speed. Alternatively, full operating temperature may be applied with the load or driven speed being gradually changed. Projections 84 are rigidly attached to cylinder body 86. First the cylinder expands to its normal condition at operating temperature, and then as the piston expands projections 84 begin to contact the refractory coating 16, and begin to wear the coating into a perfect cylinder. As earlier described in one embodiment of the invention, the projections may be formed of a material having a coefficient of expansion of approximately one at operating temperature so that localized heating of the projections will not unduly influence their size. The outer diameter of the projection at operating temperature is preferably identical to the outer diameter of the permanent operating piston 24 which will be inserted in the cylinder after the shaping piston completes the wearing in procedure.

Figure 3:
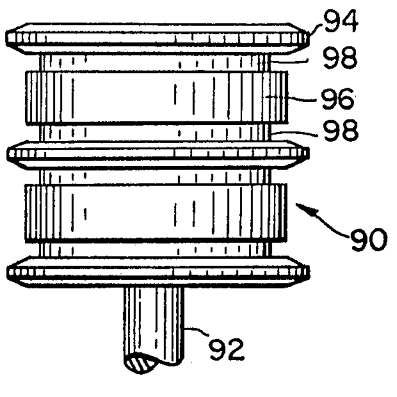
FIG. 3 is an elevation of a modification of a shaping piston suitable for use in the present invention.

An alternate embodiment of the shaping piston is generally referred to by the numeral 90 in FIG. 3. As in the earlier embodiment, the shaping piston 90 is rigidly attached to rod 92, and projections 94 extend outward from the piston body 96. Recesses 98 are formed in cylinder body 96 adjacent projections 94 to receive and hold material removed from coating 16 in the wearing in operation.

While the preferred embodiment contemplates projections formed in bands on the shaping piston body, similar wearing in advantages may be obtained with one or more projections which individually or is corporation with other projections encircle the body either in the plane of a piston base or at an angle to the piston axis, such as in helical form.

While the invention has been particularly shown and described with reference to a preferred embodiment thereof, it will be understood by those skilled in the art that various changes in form and details may be made therein without departing from the spirit and scope of the invention.

What is claimed is:

1. Expansible chamber apparatus comprising a cylinder, a ceramic lining internally mounted on the cylinder side walls, heat controlling means connected to the expansible chamber apparatus for controlling operating temperature of the cylinder, a shaping piston having a projection peripherally extending from the outer radial surface of said shaping piston into engagment with the ceramic lining, reciprocating means connected to the shaping piston for reciprocating the shaping piston in the cylinder whereby the lining of the apparatus conforms to outer dimensions of the projection when the operating temperature is reached, and further comprising a substitute piston comprising a permanent piston having an outer dimension commensurate with the outer dimension of the projection, and wherein the reciprocating means comprises detachable connecting means connected to the shaping piston for allowing detachment of the shaping piston from the reciprocating means and for allowing attachment of the permanent piston, whereby the permanent piston may be mounted within the cylinder.

2. The apparatus of claim 1 wherein the shaping piston has a plurality of radially outward extending coextensive projections at spaced intervals.

3. The method of expansible chamber operation comprising coating an interior wall of a cylinder with a refractory material, inserting a shaping piston having peripherally extending shaping projections in the interiorally coated cylinder, increasing operating temperature of the expansible chamber, and reciprocating the shaping piston in the cylinder, thereby heating and expanding the coated cylinder and the shaping piston, contacting the refractory material with the projections of the reciprocating shaping piston, and shaping the coating, removing the shaping piston from the cylinder, and inserting in the cylinder a permanent piston radially commensurate with the shaping piston projections, and reciprocating the permanent piston.

4. The product formed by the method of claim 3.

* * * * *